(12) United States Patent
Stan et al.

(10) Patent No.: US 11,796,333 B1
(45) Date of Patent: Oct. 24, 2023

(54) METHODS, SYSTEMS AND COMPUTER READABLE MEDIA FOR AUGMENTED REALITY NAVIGATION IN NETWORK TEST ENVIRONMENTS

(71) Applicant: Keysight Technologies, Inc., Santa Rosa, CA (US)

(72) Inventors: Razvan Ionut Stan, Agoura Hills, CA (US); Thomas Ameling, Woodland Hills, CA (US); Lyle Eugene Thompson, Thousand Oaks, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 491 days.

(21) Appl. No.: 16/788,272

(22) Filed: Feb. 11, 2020

(51) Int. Cl.
*G01C 21/36* (2006.01)
*G06F 3/01* (2006.01)
*G01C 21/34* (2006.01)
*G01C 21/20* (2006.01)

(52) U.S. Cl.
CPC .......... *G01C 21/3626* (2013.01); *G01C 21/206* (2013.01); *G01C 21/3415* (2013.01); *G01C 21/3438* (2013.01); *G05B 2219/32014* (2013.01); *G06F 3/011* (2013.01)

(58) Field of Classification Search
CPC .............. G01C 21/3626; G01C 21/206; G01C 21/3415; G06F 3/011; G01C 21/3438; G05B 2219/32014; G01C 21/3635; G01C 21/3638; G01C 21/3697
See application file for complete search history.

(56) References Cited

U.S. PATENT DOCUMENTS

| 6,341,158 | B1 | 1/2002 | Corso, III et al. |
| 8,761,811 | B2 | 6/2014 | Alonzo |
| 8,773,467 | B2 | 7/2014 | Chen-Quee et al. |
| | | (Continued) | |

FOREIGN PATENT DOCUMENTS

JP 2018-049010 A 3/2018

OTHER PUBLICATIONS

Antunes, "Blippar's AR tech does indoor navigation without SLAM or beacons," https://www.spar3d.com/news/related-new-technologies/blippars-ar-tech-does-indoor-navigation-without-slam-or-beacons/, pp. 1-4 (Aug. 21, 2018).
(Continued)

*Primary Examiner* — David A Testardi
(74) *Attorney, Agent, or Firm* — Jenkins, Wilson, Taylor & Hunt P.A

(57) ABSTRACT

The subject matter described herein includes methods, systems, and computer readable media for augmented reality navigation in network test environments. A method for augmented reality navigation in network test environments includes at a user device of a user, wherein the user device is executing an augmented reality (AR) navigation application: communicating, to an AR navigation system, user location information and resource identification information obtained from a visual code or a user interface, wherein the resource identification information indicates a physical network testing or monitoring resource in a real-world test environment; receiving, from the AR navigation system, navigation information for navigating the user to the physical network testing or monitoring resource; and providing, via a display, the navigation information for navigating the user to the physical network testing or monitoring resource.

20 Claims, 9 Drawing Sheets

(56) References Cited

U.S. PATENT DOCUMENTS

| | | | |
|---|---|---|---|
| 9,401,849 | B2 | 7/2016 | Tanaka |
| 9,672,648 | B2 | 6/2017 | Park et al. |
| 9,918,190 | B2 | 3/2018 | Bourque et al. |
| 9,959,674 | B2 | 5/2018 | Chen et al. |
| 10,109,108 | B2 | 10/2018 | Miller et al. |
| 10,288,432 | B1 | 5/2019 | Sokolov et al. |
| 10,332,314 | B2 | 6/2019 | Oar et al. |
| 10,423,866 | B2 | 9/2019 | Guionneau et al. |
| 10,438,409 | B2 | 10/2019 | Todeschini et al. |
| 10,581,199 | B2 | 3/2020 | Werner et al. |
| 10,650,591 | B1* | 5/2020 | Muskin .............. G06T 15/005 |
| 10,663,302 | B1* | 5/2020 | Shen .................... G06V 20/20 |
| 10,666,768 | B1* | 5/2020 | Johnson ............... G06T 11/00 |
| 2002/0095487 | A1 | 7/2002 | Day et al. |
| 2003/0158652 | A1* | 8/2003 | Friedrichs et al. . G01C 21/3415 340/990 |
| 2005/0102098 | A1 | 5/2005 | Montealegre et al. |
| 2005/0111491 | A1 | 5/2005 | Caveney |
| 2008/0126002 | A1 | 5/2008 | Chang et al. |
| 2011/0287811 | A1 | 11/2011 | Mattila et al. |
| 2012/0249588 | A1 | 10/2012 | Tison et al. |
| 2012/0313963 | A1* | 12/2012 | Chen-Quee et al. ... G06F 3/147 345/593 |
| 2013/0050262 | A1 | 2/2013 | Jeon |
| 2013/0191855 | A1 | 7/2013 | Godas |
| 2013/0246026 | A1* | 9/2013 | Ceglia et al. .......... G05B 17/02 703/6 |
| 2014/0236475 | A1* | 8/2014 | Venkatraman et al. ..................... G01C 21/206 701/420 |
| 2014/0278053 | A1* | 9/2014 | Wu et al. ........... G01C 21/3647 701/408 |
| 2014/0330511 | A1* | 11/2014 | Tison et al. .......... G06T 19/006 701/428 |
| 2015/0049905 | A1* | 2/2015 | Chudy et al. .......... G06T 11/00 382/103 |
| 2015/0109334 | A1* | 4/2015 | Park et al. ............. G06T 11/60 345/633 |
| 2015/0363647 | A1* | 12/2015 | Perez et al. ............ G06V 20/20 345/633 |
| 2016/0035246 | A1* | 2/2016 | Curtis ................... H04L 67/10 340/815.4 |
| 2016/0140868 | A1* | 5/2016 | Lovett et al. ........ G06T 19/006 434/118 |
| 2017/0018274 | A1 | 1/2017 | German et al. |
| 2017/0091607 | A1* | 3/2017 | Emeis et al. ........... G06T 11/00 |
| 2018/0062869 | A1* | 3/2018 | Nugent et al. ....... H04L 67/306 |
| 2018/0234330 | A1 | 8/2018 | Johnsen et al. |
| 2018/0253601 | A1* | 9/2018 | Koo et al. ............ H04W 4/023 |
| 2018/0268220 | A1 | 9/2018 | Lee et al. |
| 2018/0335308 | A1 | 11/2018 | Zavesky et al. |
| 2019/0041637 | A1 | 2/2019 | German et al. |
| 2019/0050310 | A1 | 2/2019 | Wooton et al. |
| 2019/0057548 | A1 | 2/2019 | Singh et al. |
| 2019/0281473 | A1* | 9/2019 | Liao et al. ............. H04W 48/16 |
| 2019/0294841 | A1 | 9/2019 | Hall et al. |
| 2019/0341723 | A1 | 11/2019 | Werner et al. |
| 2020/0250430 | A1* | 8/2020 | Kishore et al. ........ H04W 76/10 |
| 2020/0250863 | A1 | 8/2020 | Shetty et al. |
| 2020/0252302 | A1* | 8/2020 | Lairsey et al. ........ G06F 3/0484 |
| 2020/0253079 | A1* | 8/2020 | Lairsey et al. ........ G06T 19/006 |
| 2020/0279407 | A1* | 9/2020 | Liljeroos et al. ........ G06T 3/40 |
| 2020/0294265 | A1* | 9/2020 | Kimura ............... A63F 13/847 |
| 2020/0294311 | A1* | 9/2020 | Holz et al. ............. G06T 19/20 |
| 2021/0056766 | A1* | 2/2021 | Price et al. .......... G06T 19/006 |
| 2021/0232819 | A1* | 7/2021 | VanBlon et al. ....... G06V 20/20 |
| 2021/0406764 | A1* | 12/2021 | Sha et al. .............. G06N 20/00 |
| 2022/0173967 | A1 | 6/2022 | Ameling et al. |

OTHER PUBLICATIONS

Dey et al., "An Evaluation of Augmented Reality X-Ray Vision for Outdoor Navigation," The 21st International Conference on Artificial Reality and Telexistence, pp. 28-32 (Nov. 2011).

Flinton et al., "Netivar: Network Information Visualization based on Augmented Reality," 2018 12th International Conference on Software, Knowledge, Information Management & Applications (SKIMA), pp. 1-9 (2018).

Henderson, Steven J. et al., "Augmented reality for maintenance and repair", Air Force Research Laboratory Report AFRL-RH-WP-TR-2007-0112, ADA475548, Aug. 2007, 70 pages (Year: 2007).*

Herbert et al., "An AR Network Cabling Tutoring System for Wiring a Rack," International Conference on Artificial Reality and Telexistence Eurogenics Symposium on Virtual Environments, pp. 1-2 (2017).

Kasprzak et al., "Feature-based Indoor Navigation using Augmented Reality," School of Engineering & Computing Glasgow Caledonian University, pp. 1-8 (Nov. 25, 2019).

Kasprzak, Sebastian et al., "Feature-based Indoor Navigation using Augmented Reality", 2013 9th International Conference on Intelligent Environments, 18-Jul. 19, 2013, © 2013 IEEE, pages 100-107 (Year: 2013).*

Makarov, "How Augmented Reality-based Indoor Navigation Works," https://mobidev.biz/blog/augmented-reality-indoor-navigation-app-developement-arkit, pp. 1-22 (Jul. 30, 2019).

Mendez, "Update: Indoor Real-Time Navigation with SLAM on Your Mobile," https://community.arm.com/developer/tools-software/graphics/b/blog/posts/indoor-real-time-navigation-with-slam-on-your-mobile, pp. 1-29 (Nov. 7, 2018).

Non-Final Office Action for U.S. Appl. No. 17/106,857 (Jul. 21, 2022).

Notice of Allowance for U.S. Appl. No. 17/106,857 (Nov. 16, 2022).

Tillman et al., "Apple ARKit explained: Everything you need to know about Apple's augmented reality platform," Pocket-lint Limited, pp. 1-7 (Jun. 2019).

* cited by examiner

METHODS, SYSTEMS AND COMPUTER READABLE MEDIA FOR AUGMENTED REALITY NAVIGATION IN NETWORK TEST ENVIRONMENTS

TECHNICAL FIELD

The subject matter described herein relates to indoor navigation systems. More particularly, the subject matter described herein relates to methods, systems, and computer readable media for augmented reality navigation in network test environments.

BACKGROUND

Indoor navigation systems are usefully for directing users to various destinations, e.g., within a building, data center, or campus. However, while global positioning system (GPS) based navigation systems (e.g., phone-based or car-based navigation applications) have become increasing commonplace, indoor navigation systems are not yet ubiquitous. Various reasons exist for this discrepancy. For example, GPS technology is generally not accurate enough for navigating inside buildings and beacon based systems generally require extensive setup work and accuracy is limited in some conditions.

SUMMARY

The subject matter described herein includes methods, systems, and computer readable media for augmented reality navigation in network test environments. A method for augmented reality navigation in network test environments includes at a user device of a user, wherein the user device is executing an augmented reality (AR) navigation application: communicating, to an AR navigation system, user location information and resource identification information obtained from a visual code or a user interface, wherein the resource identification information indicates a physical network testing or monitoring resource in a real-world test environment; receiving, from the AR navigation system, navigation information for navigating the user to the physical network testing or monitoring resource; and providing, via a display, the navigation information for navigating the user to the physical network testing or monitoring resource.

A system for augmented reality navigation in network test environments includes a user device; and at least one processor, wherein the user device is executing an AR navigation application using the at least one processor, wherein the AR navigation application is further configured for: communicating, to an AR navigation system, user location information and resource identification information obtained from a visual code or a user interface, wherein the resource identification information indicates a physical network testing or monitoring resource in a real-world test environment; receiving, from the AR navigation system, navigation information for navigating the user to the physical network testing or monitoring resource; and providing, via a display, the navigation information for navigating the user to the physical network testing or monitoring resource.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

Figure 1:
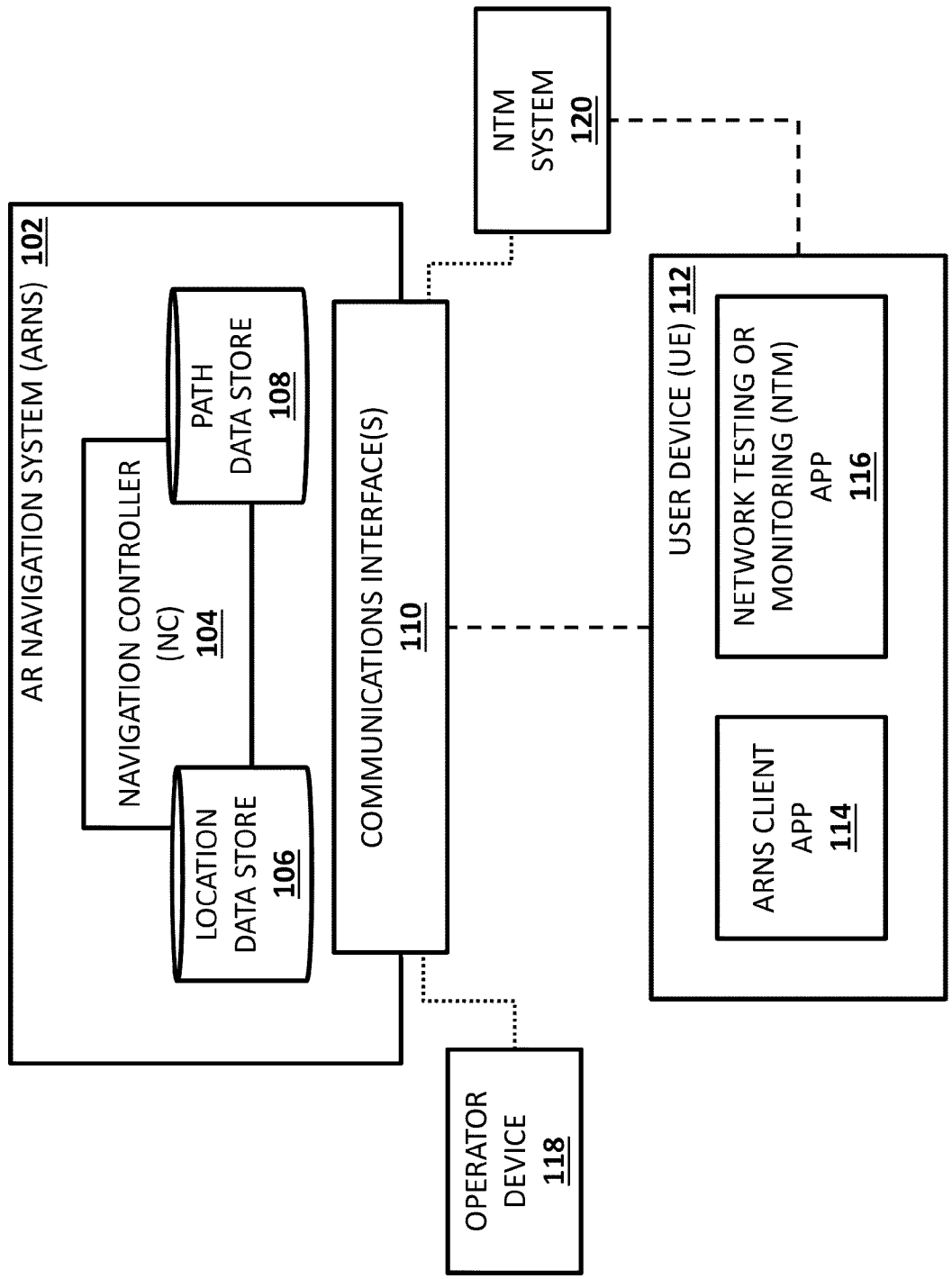
FIG. 1 is a block diagram illustrating an example environment including an augmented reality navigation system for performing various navigation related services.

FIG. 1 is a block diagram illustrating an example environment 100 including an augmented reality (AR) navigation system (ARNS) 102 for performing various navigation related services. Referring to FIG. 1, environment 100 may include ARNS 102, user device 112, an operator device 118, and a network testing or monitoring (NTM) system 120. ARNS 102 may represent any suitable entity (e.g., one or more computing platforms or a device implemented using at least one processor) for performing various aspects associated with AR navigation. For example, ARNS 102 may receive a user request for navigation instructions usable for navigating to a destination (e.g., a physical chassis or a lab technician's office) and, after determining an adequate path to the destination, ARNS 102 may provide the navigation instructions which can then be converted into an augmented path overlay for reaching the destination (e.g., via an ARNS client app 114 executing on user device 112). In some embodiments, ARNS 102 may include NC 104, location data store 106, path data store 108, and one or more communications interface(s) 110.

NC 104 may represent any suitable entity or entities (e.g., software executing on at least one processor) for performing various aspects associated with AR navigation or related services. For example, NC 104 may also include functionality for finding or navigating to physical network testing or monitoring resources (e.g., devices, components, chassis, servers, etc.), people (e.g., testers, lab technicians, AR navigation users, etc.), and/or related areas (e.g., offices, cubicles, test labs, etc.). In this example, NC 104 may receive various types of training information from one or more client apps 114 for learning about a real-world environment, may process the information for identifying points of interest and navigable paths to those points of interest, and may store received information and derived information in one or more data stores, e.g., location data store 106 and path data store 108.

Location data store 106 may represent any suitable entity (e.g., a computer readable medium, a database, a storage device, or memory) for storing user location information, resource location information, AR positional information, and/or other data. For example, location data store 106 may store AR positional information of an entity (e.g., resource, person, or area) and one or more identifiers representing the entity.

Path data store 106 may represent any suitable entity (e.g., a computer readable medium, a database, a storage device, or memory) for storing path or route information, navigation information, path models, and/or other data. For example, after ARNS 102 or NC 104 learns a walkable path to a particular physical resource, path data store 106 may store navigating information for helping a user navigate to the physical resource along one or more identifiers representing the physical resource and/or path model.

Communications interface(s) 110 may represent any suitable entities (e.g., network interface cards (NICs), port modules, and/or other hardware or software) for receiving and sending communications via various communications protocols and/or data formats. For example, communications interface(s) 110 may include a configuration interface for configuration various settings of ARNS 102. In another example, communications interface(s) 110 may include a user interface (UI), a graphical UI (GUI), and/or an application programming interface (API) for allowing operator device 118 or another entity to interact with ARNS 102.

Operator device 118 may be any entity (e.g., an automated system or a device or system controlled or controllable by a human user) for selecting, viewing, and/or configuring various aspects associated with ARNS 102 or NC 104. For example, operator device 118 may provide configuration information to ARNS 102 via communications interface(s) 110. Example UIs for interacting with ARNS 102 or NC 104 may support automation (e.g., via one or more scripting languages), a representation state transfer (REST) API, a command line, and/or a web based GUI.

NTM system 120 may represent any suitable entity (e.g., one or more computing platforms or devices implemented using at least one processor) for performing various aspects associated with monitoring or testing one or more networks, e.g., enterprise networks, telecommunications network, etc.

For example, NTM system 120 may include hardware or physical resources (e.g., platforms, chassis, port modules, devices, etc.) that are located in different physical locations (e.g., different lab rooms in the same building, different buildings on the same campus, etc.). In this example, physical resources may include test system components as well as components of a device or system under test (SUT). In some embodiments, NTM system 120 may include one or more management nodes for configuring various NTM resources for implementing one or more test or monitoring functions. In such embodiments, users may interact with the management node(s) via an NTM app 116 running on the device or via another method, e.g., a browser based GUI.)

User device 112 may represent any suitable entity (e.g., a smart phone, a mobile device, a laptop, one or more computing platforms, etc.) for performing various aspects associated with using AR related navigation services. In some embodiments, user device 112 may include a camera, a display, and hardware and software for running various applications, such as an ARNS client app 114 and/or an NTM app 116. Client app 114 and/or NTM app 116 may be programmed or configured to interact with ARNS 102 or NC 104. In some embodiments, NTM app 116 may interact with a related NTM system 120 and/or may configure various testing and/or monitoring resources associated with NTM system 120. In this example, NTM app 116 may also provide various information about physical resources (e.g., QR locator codes, serial numbers, location identifiers, or other data) to ARNS 102 for navigation services or other purposes. In some embodiments, client app 114 may request and receive navigation information and may utilize an AR kit (e.g., ARKit 3) or other software to display navigation information via an AR overlay on a live video or another method. In some embodiments, client app 114 may utilize an AR kit or related software to perform image recognition on video frames captured by a camera of user device 112 and may use this technology to derive the current position of the user or entities in the video frames.

It will be appreciated that FIG. 1 is for illustrative purposes and that various depicted entities, their locations, and/or their functions described above in relation to FIG. 1 may be changed, altered, added, or removed.

Figure 2:
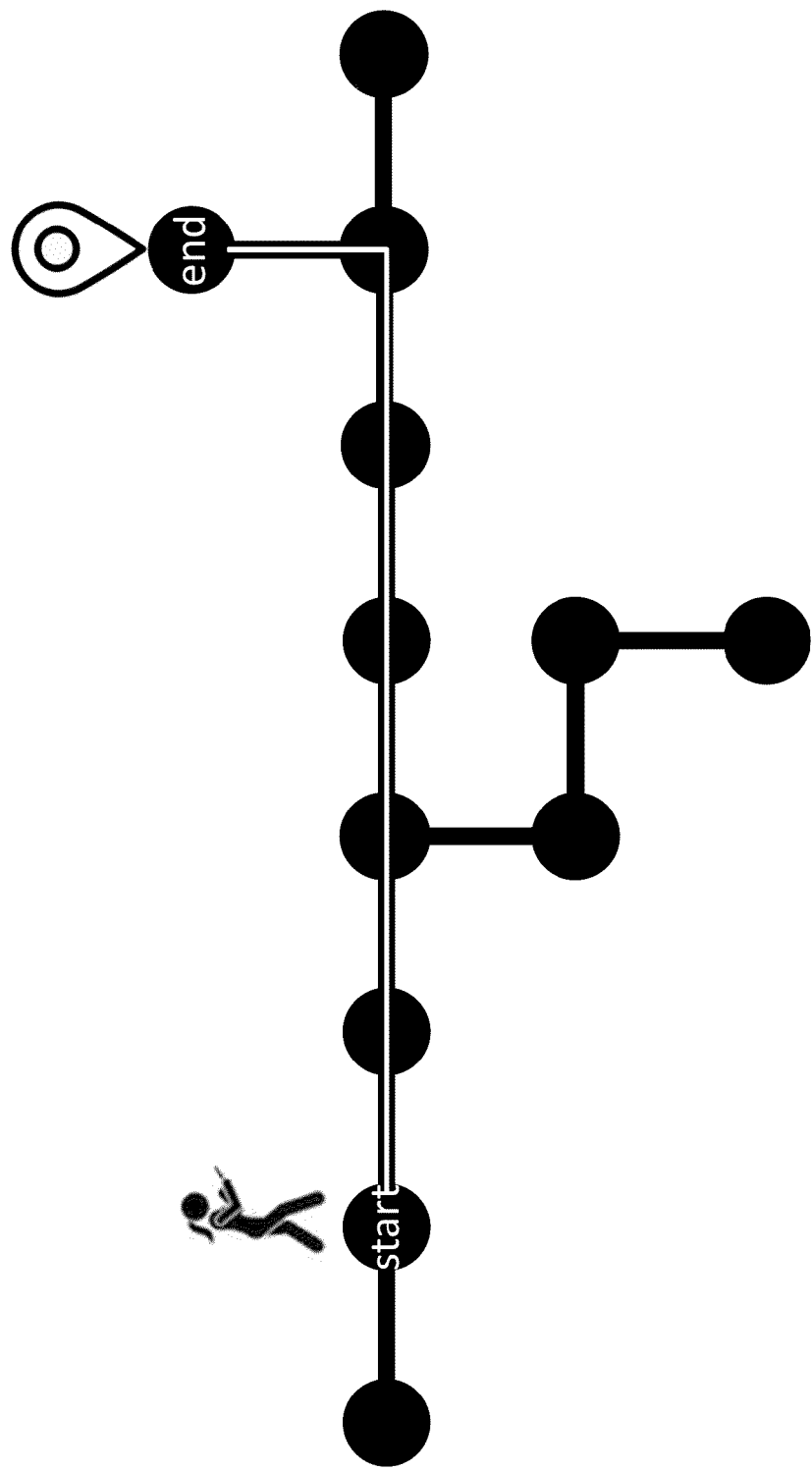
FIG. 2 is a block diagram illustrating an example path to a destination in a mapped environment.

FIG. 2 is a block diagram illustrating an example path 200 to a destination in a mapped environment. Referring to FIG. 2, path 200 may be represented by a number of dots or points from a starting point (e.g., where the user currently is at) an ending point (e.g., a destination or location of the entity or object being sought by the user). Each dot or point may represent a constant or varying real-world distance (e.g., 2-10 feet) or may represent a real-world or virtual entity (e.g., a door, an office, a wireless internet coverage area, a virtual zone or marker, etc.).

In some embodiments, path 200 may be determined by ARNS 102 or NC 104 after an environment has been mapped (e.g., after ARNS 102 or NC 104 has learned one or more ways to various entities in the environment.) For example, after an environment has been adequately learned, a user, via user device 112, may scan a QR locator code or otherwise select (e.g., via a GUI for interacting with ARNS 102) a destination (e.g., a test system resource or a technician's office) for receiving AR based navigation instructions. In this example, ARNS 102 or NC 104 may receive the request and using stored information from location data store 106 and path data store 108 may determine path 200. Continuing with this example, ARNS 102 or NC 104 may provide path 200 or related information to the user via user device 112 and user device 112 may use the provided information to generated AR based navigation instructions (e.g., a path overlay on to a video of the user's real-world environment for navigating the user to the desired destination).

It will be appreciated that FIG. 2 is for illustrative purposes and that various depicted entities, their locations, and/or their functions described above in relation to FIG. 2 may be changed, altered, added, or removed.

Figure 3:
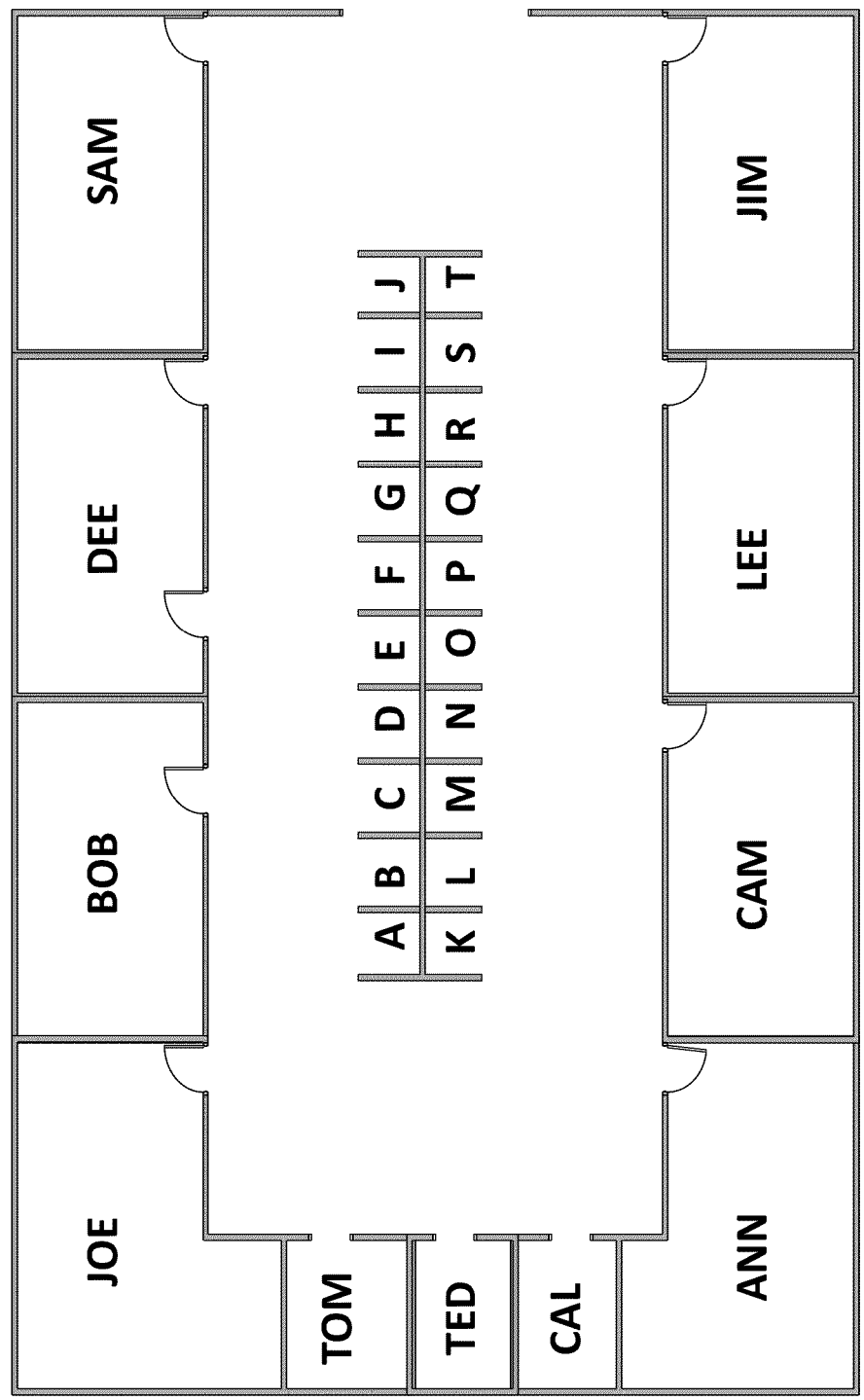
FIG. 3 is a block diagram illustrating an example office layout for deriving names and locations associated with a mapped environment.

FIG. 3 is a block diagram illustrating an example office layout 300 for deriving names and locations associated with a mapped environment. In some embodiments, ARNS 102 or NC 104 may receive an image or digital file of office layout 300 via client app 114. In such embodiments, ARNS 102 or NC 104 may process office layout 300 to learn walkable paths or routes in a real-world environment. For example, ARNS 102 or NC 104 may use image recognition technology on office layout 300 for identifying labels, e.g., cubicle numbers or identifiers (e.g., 'A') and/or employee names (e.g., 'Sally'), and may use these labels to automatically tag points of interest and save them as part of a virtual map or representation of the office. In some embodiments, ARNS 102 or NC 104 may use image recognition technology on office layout 300 for identifying halls or gaps between walls depicted in office layout 300, which may be indicative of walkable or navigable paths through the real-world environment.

In some embodiments, ARNS 102 or NC 104 may optimize a virtual map or representation of the office depicted in office layout 300 by requesting a user (while carrying user device 112 running client app 114) visit two or more points of office layout 300 in the real-world environment order such that the scale of office layout 300 can be determined and utilized for discerning walkable paths from office layout 300. For example, after a user walks to two points, ARNS 102 or NC 104 may receive distance information between the two points and may use that information in determining the scale (e.g., depicted distance to actual distance ratio) of the office layout 300 and may generate an appropriate virtual map or representation based on this determination.

It will be appreciated that FIG. 3 is for illustrative purposes and that various depicted entities, their locations, and/or their functions described above in relation to FIG. 3 may be changed, altered, added, or removed.

Figure 4:
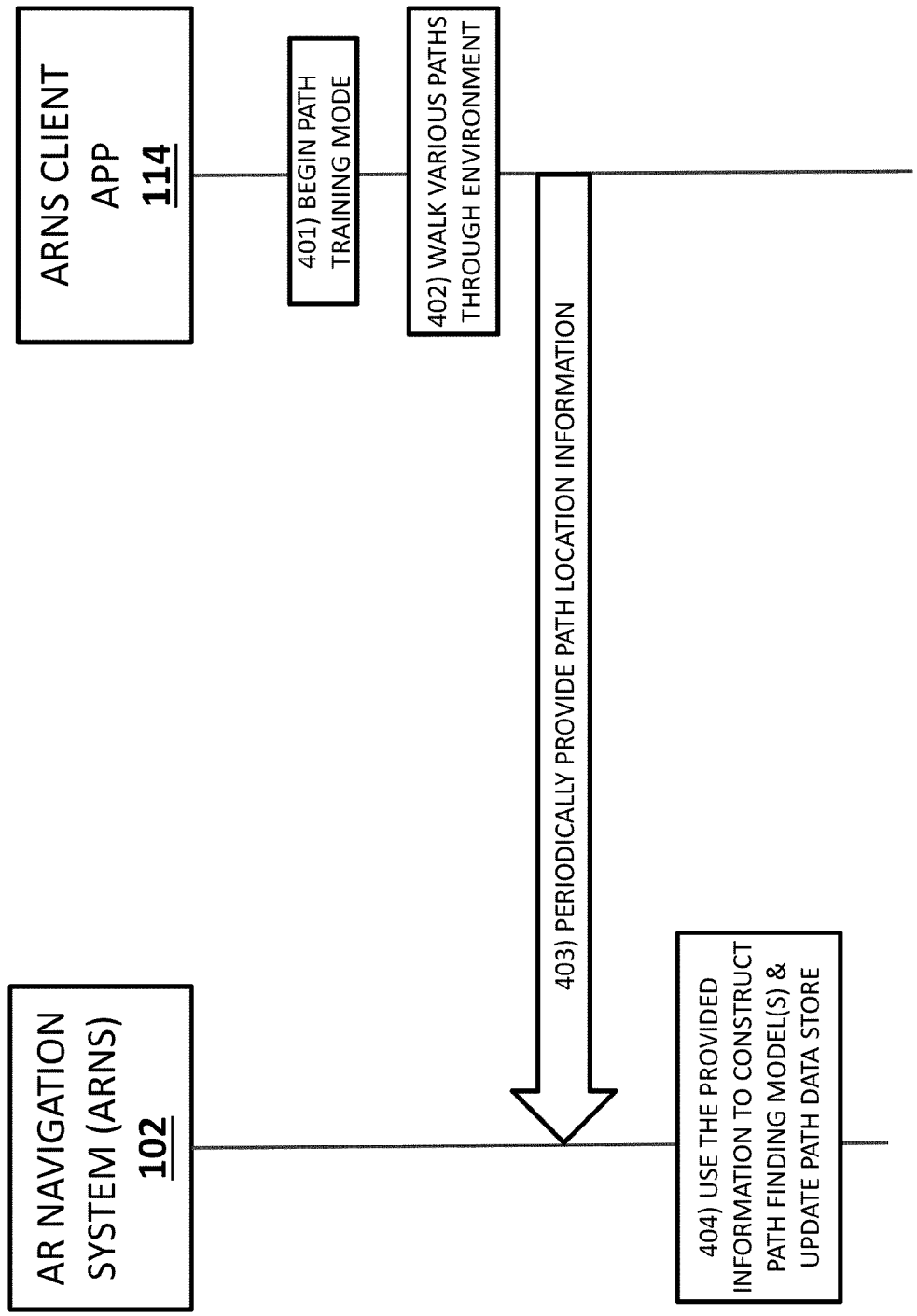
FIG. 4 depicts a message flow diagram illustrating an example first training mode operation associated with an augmented reality navigation system.

FIG. 4 depicts a message flow diagram illustrating an example first training mode operation 400 associated with an augmented reality navigation system. In some embodiments, client app 114 may include a training mode of operation usable for identifying paths or routes through a real-world environment and providing path information to ARNS 102 and/or NC 104. In some embodiments, client app 114 may be configured to request such training from the user or may perform training when client app 114 is running.

In some embodiments, training mode operation 400 is usable for implementing navigation functionality in ARNS 102 and/or a related network testing or monitoring system. For example, by learning walking paths in a real-world environment, ARNS 102 and/or NC 104 may identify one or more ways to reach a desired point of interest (e.g., a physical network testing or monitoring resource, a tester or lab technician, or a test lab or data center).

In some embodiments, training mode operation 400 is useful improving and/or updating available routes and/or identifying new routes in a changing real-world environment. For example, AR-based client app 114 may use image processing to identify a user's position or location. In this example, e.g., in an indoor environment, visuals may change over time due to objects being moved, added, or removed and, as such, may cause navigation to fail if client app 114 is unable to recognize the current user position in the environment. In some embodiments, training mode operation 400 may be utilized continuously or periodically to help ensure that the real-world environment is tracked or mapped adequately even with a slowly changing environment over time and to help ensure that map data or path related information data is self-improving over time, including finding new walkable paths.

Referring to FIG. 4, in step 401, client app 114 may enter a 'path training' mode. For example, a user may select a 'pathtraining' mode via a GUI provided by client app 114. In another example, a 'pathtraining' mode may be selected automatically (e.g., as part of an initial setup phase) or may be invisible to a user.

In step 402, while in 'pathtraining' mode, a user carrying user device 112 running client app 114 may walk or move around a real-world environment (e.g., an office building or campus) with the user device's camera engaged. In some embodiments, while in 'pathtraining' mode, client app 114 may learn or observe points of interest (e.g., landmarks or anchors) and may compute AR-based positional and/or path information associated with these points of interest.

In step 403, gathered path training information may be periodically or aperiodically communicated to ARNS 102 and/or NC 104, where it is used to effectively provision the AR Navigation subsystem.

In step 404, ARNS 102 and/or NC 104 may use the provided information from client app 114 to construct or generate one or more path models or related navigation information for navigating in the real-world environment and may store the one or more path models or related navigation information in path data store 108.

It will be appreciated that FIG. 4 is for illustrative purposes and that various depicted messages and details for training ARNS 102 or related aspects described above in relation to FIG. 4 may be changed, altered, added, or removed.

Figure 5:
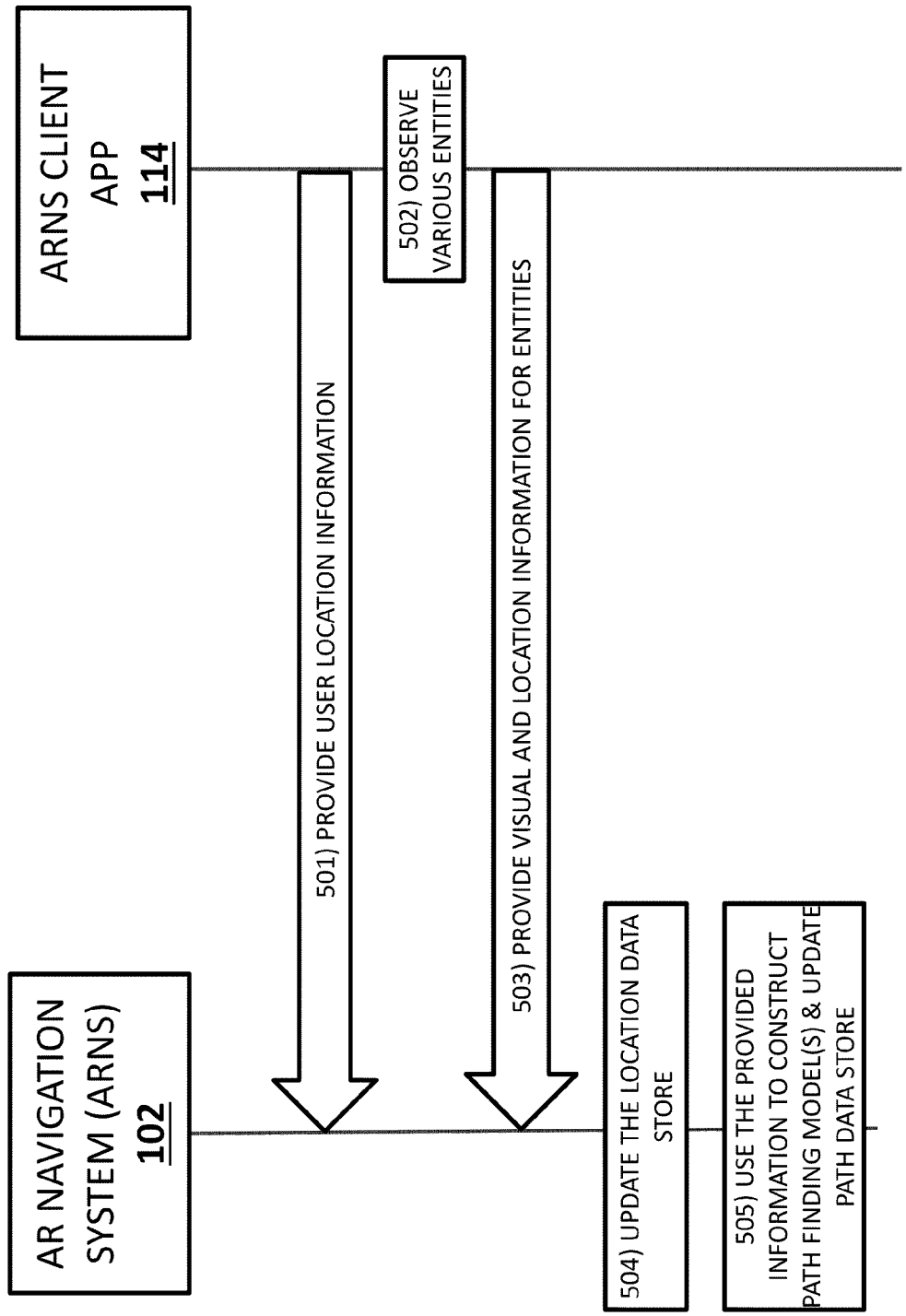
FIG. 5 depicts a message flow diagram illustrating an example second training mode operation associated with an augmented reality navigation system.

FIG. 5 depicts a message flow diagram illustrating an example second training mode operation 500 associated with an augmented reality navigation system. In some embodiments, client app 114 may include a training mode of operation usable for identifying people (e.g., a lab technician or a network device tester) or related areas (e.g., a person's lab or office) and providing location information to ARNS 102 and/or NC 104 for these people and areas. In some embodiments, client app 114 may be configured to request such training from the user or may perform training when client app 114 is running and people or related areas are discovered (e.g., faces, door plates, or ID badges are visible to the camera).

In some embodiments, training mode operation 500 is usable for implementing people finding functionality in ARNS 102 and/or a related network testing or monitoring system. In such embodiments, a user, e.g., via user device 112 running client app 114, may quickly locate and navigate to a person (e.g., a tester) or a related area (e.g., a test lab) in a real-world test environment (e.g., a building, a university, a data center, a campus, etc.).

In some embodiments, positions of persons within a real-world environment may be determined and/or computed using AR-based positional measurement techniques (e.g., by using an AR kit and related image processing) and/or using one or more non-AR-based positional measurement techniques (e.g., by using GPS, beacons, Wi-Fi estimation, or via a combination of some or all of these types of techniques).

Referring to FIG. 5, in step 501, user location information obtained or generated by client app 114 may be provided to ARNS 102 and/or NC 104. In some embodiments, user location information (e.g., positional information) may be reported via various methods. For example, each person's user device 112 that is running client app 114 may compute its current position and report its position on a periodic or aperiodic basis. In another example, ARNS 102 and/or NC 104 can be configured to poll each person's client app 114 on a periodic or aperiodic basis.

In step 502, each person's client app 114 may observe a related camera's visual field of vision for relevant persons or other entities. For example, each client app 114 may be configured to monitor a related camera's field of vision for faces of other persons (e.g., users of client app 114) and/or relevant objects (e.g., ID badges, office plates, etc.). In this example, client app 114 may utilize facial recognition technology and/or optical character recognition technology to derive or obtain person's name or other identifiers. As such, users of client app 114 may continually provide updates of their own position and other person's AR-based positions within the environment.

In step 503, visual information and location information associated with one or more observed entities may be sent from client app 114 to ARNS 102 and/or NC 104 for processing. For example, client app 114 executing on user device 112 may use AR positional measurement techniques or other techniques to determine the user device's position when a QR locator code is scanned and/or when an NFC and/or RFID chip is read and may report this positional information to ARNS 102 and/or NC 104.

In some embodiments, after receiving visual information and location information, ARNS 102 or a related entity (e.g., NC 104) may perform facial recognition processing using provided visual information to identify the person or entity. Once a person or entity is positively identified by ARNS 102 or a related entity, provided positional information may associated with the identified person (e.g., using an unique identifier) and may be stored in location data store 106.

In step 504, ARNS 102 or a related entity may store provided resource location information in location data store 106. For example, ARNS 102 or NC 104 may store AR positional information for a physical resource in location data store 106, where the AR positional information is indexed by a related resource identifier.

In step 505, ARNS 102 and/or NC 104 may use the provided information from client app 114 to construct or generate one or more path models or related navigation information for navigating a user to one or more discovered entities and may store the one or more path models or related navigation information in path data store 108.

It will be appreciated that FIG. 5 is for illustrative purposes and that various depicted messages and details for training ARNS 102 or related aspects described above in relation to FIG. 5 may be changed, altered, added, or removed.

Figure 6:
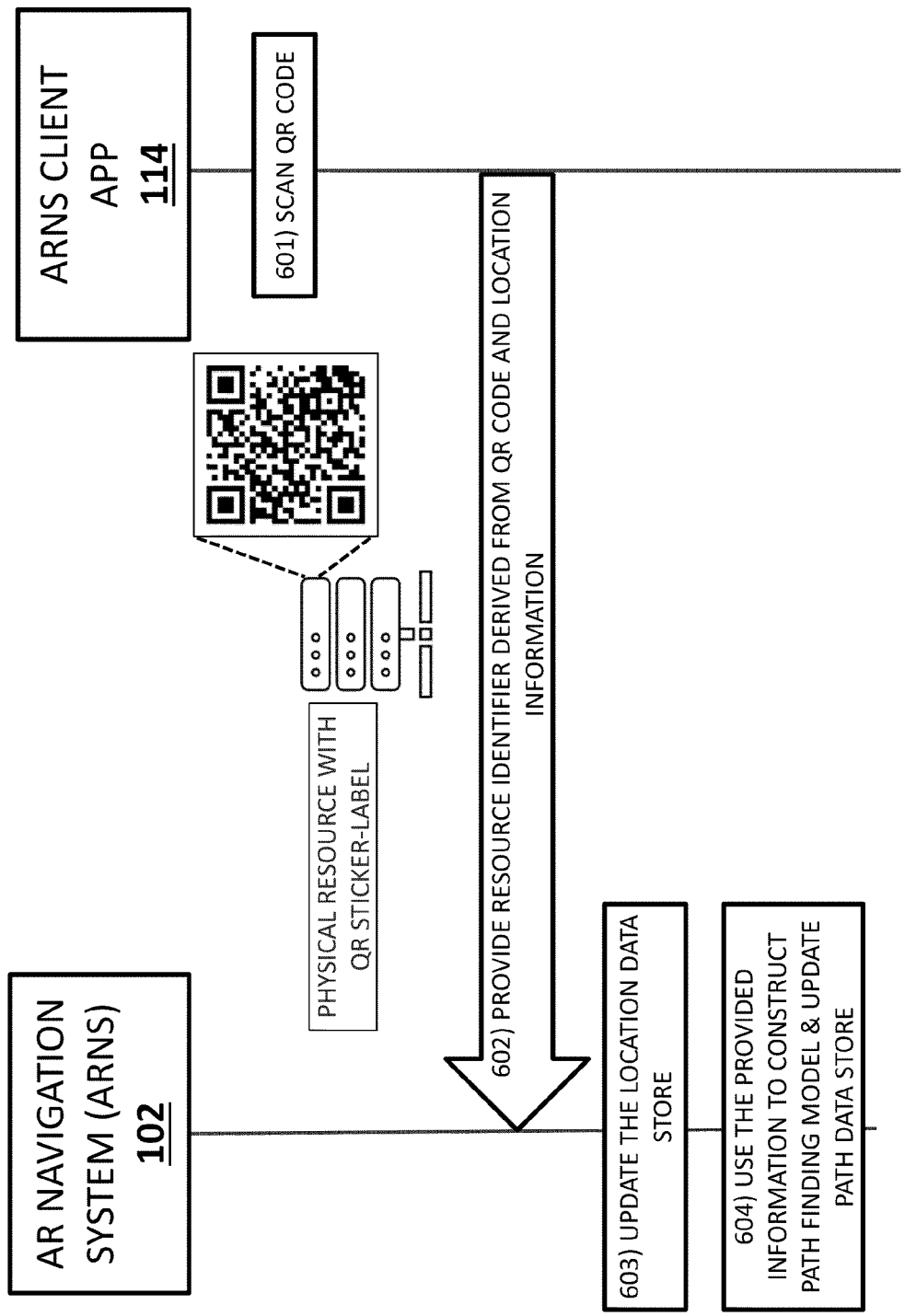
FIG. 6 depicts a message flow diagram illustrating an example third training mode operation associated with an augmented reality navigation system.

FIG. 6 depicts a message flow diagram illustrating an example third training mode operation 600 associated with an augmented reality navigation system. In some embodiments, client app 114 may include a training mode of operation usable for identifying reachable entities and providing location information to ARNS 102 and/or NC 104 for these entities, e.g., points of interests like a test or monitoring resource, a person, or a person's office. In some embodiments, client app 114 may be configured to request such training from the user or may perform training when client app 114 is running and entities are discovered (e.g., QR locator codes are visible to the camera).

In some embodiments, training mode operation 600 is usable for implementing resource finding functionality in ARNS 102 and/or a related network testing or monitoring system. In such embodiments, a user, e.g., via user device 112 running client app 114, may quickly locate and navigate to a physical network testing or monitoring resource (e.g., a test system component, a load module, a chassis, a port module, etc.) in a real-world test environment (e.g., a building, a test lab, campus, etc.).

In some embodiments, e.g., prior to a user using client app 114, various physical resources may be assigned identifiers and the identifiers may be encoded as QR locator codes or other visual codes. In such embodiments, each physical resource may be labeled or otherwise tagged with these visual codes such that a user can scan or otherwise obtain the embedded identifiers using client app 114.

Referring to FIG. 6, in step 601, a user may select a physical resource (e.g., a chassis, a port module, etc.) and scan a related QR locator code which may be subsequently displayed in client app 114 or another location, e.g., a separate GUI, a laptop screen, or a desktop monitor. For example, user device 112 running client app 114 may be configured to scan and interpret or resolve a visual code (e.g., QR locator code) that is affixed to the surface of a physical resource. In this example, client app 114 or a related third party code scanner may resolve the visual code to obtain an encoded serial number and or other unique identifier (e.g., universally unique identifier (UUID)) usable for identifying the physical resource (e.g., of a network testing or monitoring environment).

In some embodiments, in lieu of or in addition to scannable visual codes, resource identifiers (e.g., serial numbers and/or UUIDs) may be encoded in NFC or RFID chips that are affixed to or contained within physical resources. In such embodiments, client app 114 may use or access an NFC or RFID scanner (e.g., on user device 112) and may use this scanner to extract or obtain the resource identifiers.

In step 602, a resource identifier and related resource location information (e.g., positional information) may be sent from client app 114 to ARNS 102 and/or NC 104 for processing. For example, client app 114 executing on user device 112 may use AR positional measurement techniques or other techniques to determine the user device's position when a QR locator code is scanned and/or when an NFC and/or RFID chip is read and may report this positional information to ARNS 102 and/or NC 104. In another example, client app 114 executing on user device 112 may use AR positional measurement techniques or other techniques to determine a physical resource's position when a related QR locator code is scanned and/or when a related NFC and/or RFID chip is read and may report this positional information to ARNS 102 and/or NC 104.

In some embodiments, positions of physical resources within a real-world environment may be determined and/or computed using AR-based positional measurement techniques (e.g., by using an AR kit and related image processing) and/or using one or more non-AR-based positional measurement techniques (e.g., by using GPS, beacons, Wi-Fi estimation, or via a combination of some or all of these types of techniques).

In step 603, ARNS 102 or a related entity may store provided resource location information in location data store 106. For example, ARNS 102 or NC 104 may store AR positional information for a physical resource in location data store 106, where the AR positional information is indexed by a related resource identifier.

In step 604, ARNS 102 and/or NC 104 may use the provided information from client app 114 to construct or generate a path model or related navigation information for navigating a user to the physical resource and may store the path model or related navigation information in path data store 108.

It will be appreciated that FIG. 6 is for illustrative purposes and that various depicted messages and details for training ARNS 102 or related aspects described above in relation to FIG. 6 may be changed, altered, added, or removed.

Figure 7:
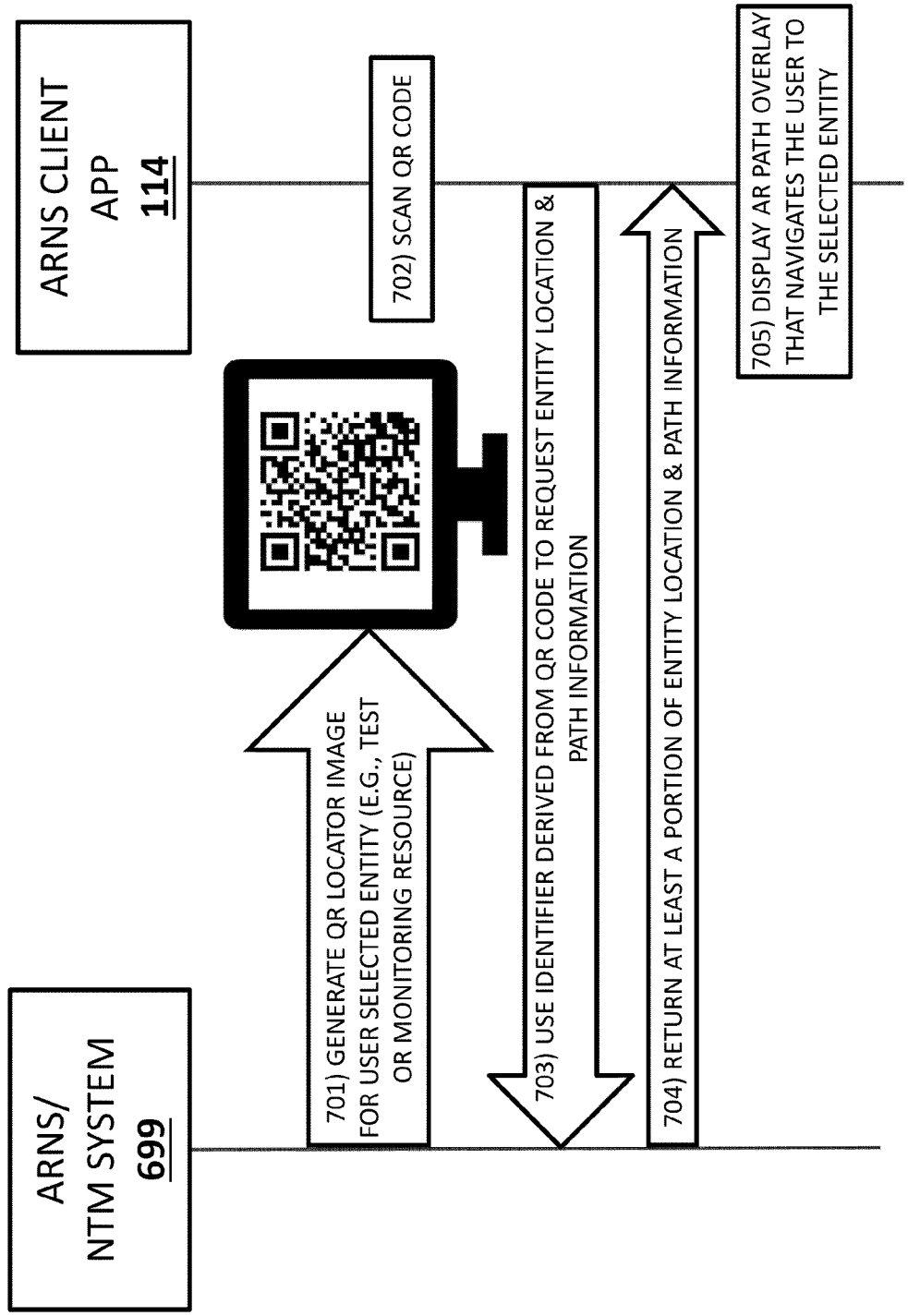
FIG. 7 depicts a message flow diagram illustrating an example navigation mode operation associated with an augmented reality navigation system.

FIG. 7 depicts a message flow diagram illustrating an example navigation mode operation 700 associated with ARNS 102. In some embodiments, client app 114 may include a finding and/or navigating mode of operation usable for selecting and navigating to one or more entities, e.g., points of interests. In some embodiments, client app 114 may be configured to prevent the finding and/or navigating mode of operation from being utilized until after ARNS 102 or navigation controller (NC) 104 is adequately provisioned or has access to resource related information (including users of the resources) and associated location and/or path information for resources and/or users. In some embodiments, instead of preventing the finding and/or navigating mode of operation from being utilized, client app 114 may be configured to notify user of potential limitations but still allow the finding and/or navigating mode of operation to be accessed and/or used.

In some embodiments, e.g., prior to a user using client app 114, various entities (e.g., physical network testing or monitoring resources, office locations, ID badges, etc.) may be assigned identifiers and the identifiers may be encoded as QR locator codes or other visual codes. In such embodiments, each entity may be labeled or otherwise tagged with these visual codes such that a user can scan or otherwise obtain the embedded identifiers using client app 114.

Referring to FIG. 7, ARNS and/or NTM system 699 may represent ARNS 102, NTM system 120, various functionality performed by ARNS 102 and NTM system 120, or interaction(s) between ARNS 102 and NTM system 120. For example, a user (e.g., using NTM app 116) may configure one or more test or monitoring resource(s). In this example, after configuration, the user may communicate (e.g., using client app 114 or NTM app 116) with ARNS 102 to retrieve a QR locator code (e.g., as an image) for a given resource. In another example, the user may retrieve additional information about a given resource from ARNS 102 and may then use that information to generate a QR locator code for the resource (e.g., within client app 114 or NTM app 116). In another example, NTM app 116 may have enough information to generate a QR locator code for a given resource without obtaining additional information from ARNS 102, but may check with ARNS 102 to determine if the resource is registered with ARNS 102.

In step 701, system 699 (e.g., ARNS 102 or NTM system 120) may generate and provide identifiers as QR locator images for distribution and/or use. For example, printed QR locator images may be affixed to various testing or monitoring system components, devices, or equipment. In another example, the QR locator codes may be stored and displayed by client app 114 for selection by a user.

In step 702, a user may select a particular entity (e.g., a chassis, a port module, etc.) and scan a related QR locator code which may be subsequently displayed in client app 114 or another location, e.g., a separate GUI, a laptop screen, or a desktop monitor.

In some embodiments, scanning a QR locator code may be performed via user device 112 (e.g., smartphone). In some embodiments, a user may use a third party QR scanner application executing on the mobile device, which in turn may trigger client app 114 to be downloaded and/or opened on user device 112.

In some embodiments, scanning a QR locator code may be performed within client app 114 executing on the user device 112, where client app 114 is associated with ARNS 102 or a related testing or monitoring system. In some embodiments, client app 114 may be a web-based application, such as an WebAR-based application.

In some embodiments, in response to scanning a QR locator code, entity identifying information that is encoded in the QR locator code may be obtained and provided to ARNS 102 or NC 104. In some embodiments, positional information associated with user device 112 and/or client app 114 may also be provided.

In some embodiments, in lieu of or in addition to scanning or selecting a QR locator code, a user may select a picture, a name, or other identifier, e.g., via a GUI in client app 114. For example, when locating a person associated with a testing or monitoring resource, active testers may appear as a list of names in a GUI displayed by client app 114, where each name in the list is selectable by a user. In this example, once selected, navigation information for navigating to the person's current location (if known) or a predetermined related location (e.g., the person's cubicle) may be requested from ARNS 102 and/or NC 104.

In step 703, a navigation request containing information obtained from the QR locator code and, optionally, positional information may be sent from client app 114 to ARNS 102 and/or NC 104 for processing.

In step 704, a response message may be sent from ARNS 102 and/or NC 104 to client app 114. In some embodiments, a response message may include navigation information (e.g., location and path information) that can be rendered within client app 114 as a camera overlay image that includes visual indicators for helping the user navigate (e.g., walk) through the environment (e.g., building or campus) towards the selected entity (e.g., a test platform or component).

In step 705, client app 114 may use navigation information to generate a camera overlay image that includes visual indicators for helping the user navigate through the environment toward the selected entity.

In some embodiments, client app 114 may be adapted to determine its position via an AR-based positioning technique and to request and/or receive from ARNS 102 and/or NC 104 relevant path information based on the user's (or his user device's) relative position within the real-world environment. In such embodiments, memory resource demands placed on user device 112 may be minimized (e.g., the entire AR map need not be downloaded and/or provided to user device 112, instead only the immediately relevant portion of the map may be downloaded).

It will be appreciated that FIG. 7 is for illustrative purposes and that various depicted messages and details for navigating using ARNS 102 or related aspects described above in relation to FIG. 7 may be changed, altered, added, or removed.

Figure 8:
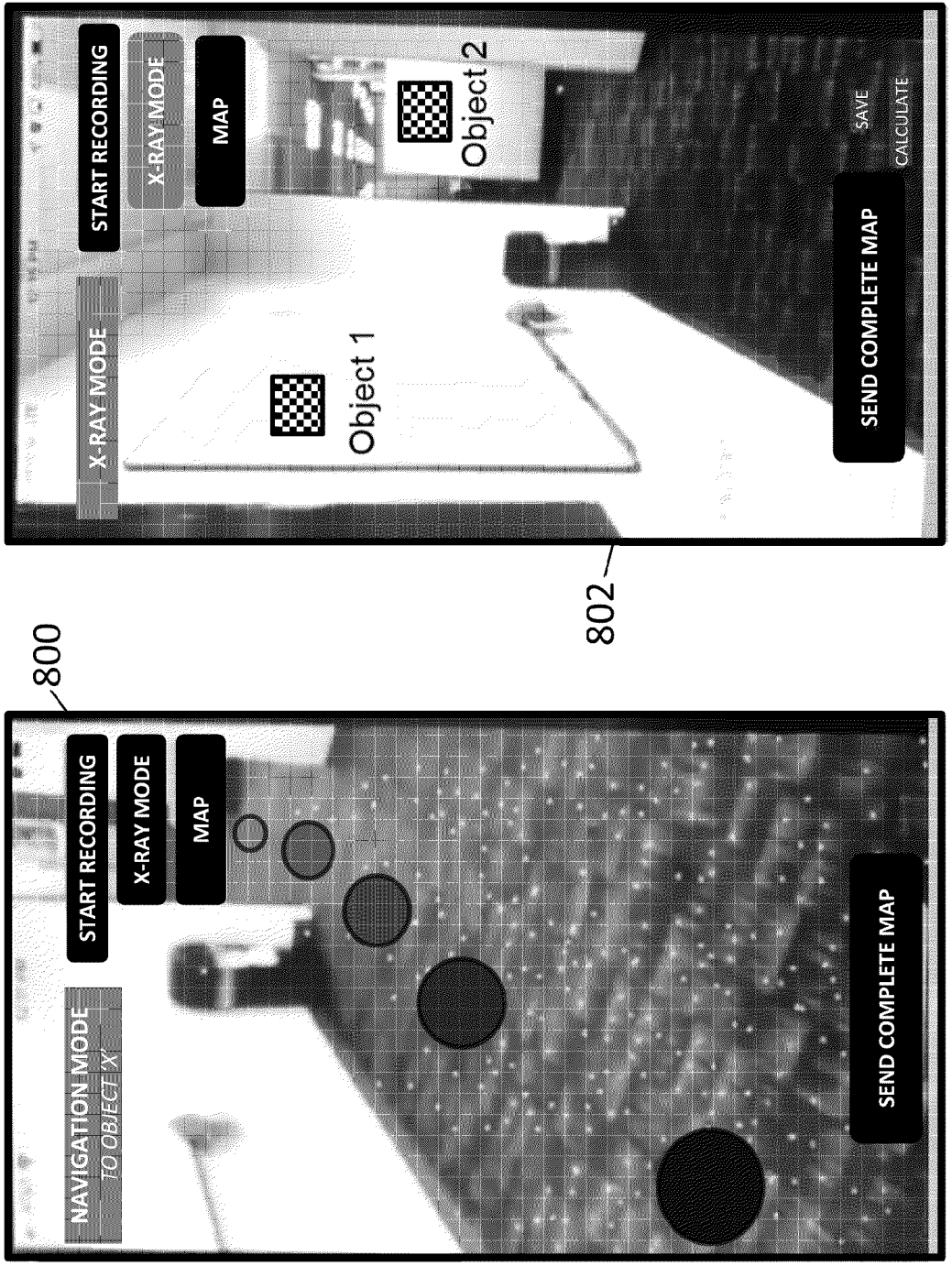
FIG. 8 depicts screenshots of an augmented reality navigation user device using a navigation mode and an x-ray mode.

FIG. 8 depicts screenshots of AR client app 114 in a navigation mode and in an x-ray mode. Referring to FIG. 8, screenshot 800 shows client app 114 operating in a navigation mode to object 'X'. The navigation mode depicted in screenshot 800 allows a user to see visual indicators (e.g., dots) overlaid onto a live video of a real-world environment. In some embodiments, as the user moves, the visual indicators may change to indicate user progress. For example, as visual indicators get closer to the user, the visual indicators may change color, grow in size, and/or become more opaque or darker. While screenshot 800 depicts a somewhat flat path of visual indicators (e.g., across a floor), it should be appreciated that visual indicators can be used for navigating vertically (e.g., to navigate to a higher or lower floor). Navigating in three-dimensional space (e.g., vertically and horizontally) is a significant advantage over convention GPS-based navigation approaches.

Screenshot 802 shows client app 114 operating in an 'x-ray' mode to object 'X'. The 'x-ray' mode depicted in screenshot 802 allows a user to see visual indicators representing relative locations of reachable entities regardless of whether the reachable entities are currently visible in the video. For example, in 'x-ray' mode, a user may move the phone around the real-world environment to see visual indicators indicating points of interest (including objects that are physically out of sight) with description overlaid on the actual camera image. In this example, the user may be able to interact with the visual indicators indicating objects of interest, e.g., by selecting a point of interest and having client app 114 automatically switch to navigation mode and show a path to the selected point. In some embodiments, in 'x-ray' mode, auxiliary information about one or more points of interest may be displayed, including but not limited to the current distance to the point of interest.

In some embodiments, while in one or more modes, client app 114 may allow video recording with or without visual indicators overlaid onto the video recording. In some embodiments, while in one or more modes, client app 114 may allow a user to change operation modes, e.g., to an 'x-ray' mode for identifying relative locations of one or more reachable entities (e.g., point of interests, such as test resources, test labs, or lab technicians).

In some embodiments, while in one or more modes, client app 114 may allow a user to manually download a complete map. In such embodiments, downloading a complete map may be useful when navigating offline or before traveling in an area with poor internet connectivity.

It will be appreciated that FIG. 8 is for illustrative purposes and that various depicted entities, their locations, and/or their functions described above in relation to FIG. 8 may be changed, altered, added, or removed.

Figure 9:
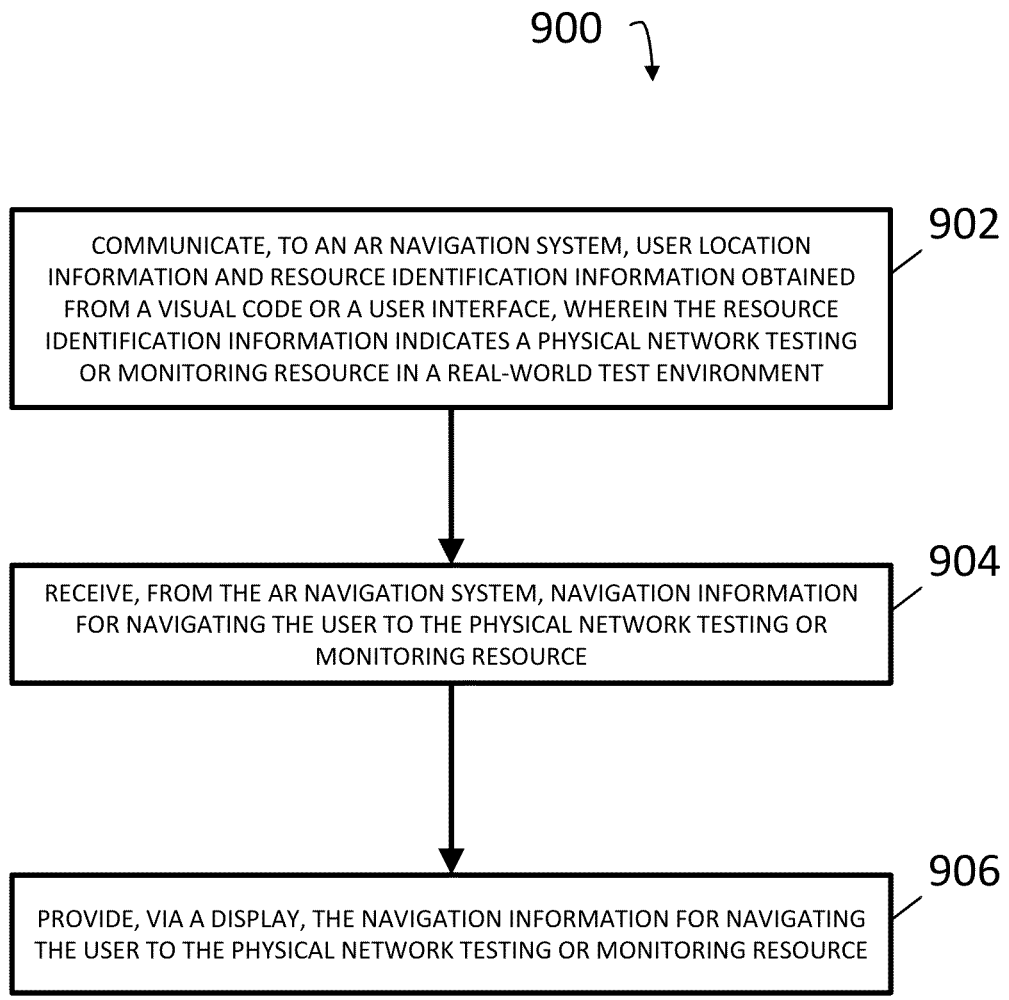
FIG. 9 is a flow chart illustrating an example process for augmented reality navigation in network test environments.

FIG. 9 is a diagram illustrating an example process 900 for augmented reality navigation in network test environments. In some embodiments, process 900, or portions thereof, may be performed by or at ARNS 102, NC 104, user device 112, client app 114, and/or another node or module. In some embodiments, process 900 may include steps 902, 904, and/or 906.

Referring to process 900, in step 902, user location information and resource identification information obtained from a visual code (e.g., a QR locator code) or a user interface(e.g., a selection GUI associated with client app 114) may be communicated to ARNS 102, wherein the resource identification information indicates a physical network testing or monitoring resource in a real-world test environment. For example, a user of user device 112 may send their current location (e.g., based on AR or non-AR positional technology) along with a request for navigation instructions to a particular test platform or chassis that is located in a data center somewhat near the user's current location.

In step 904, navigation information for navigating the user to the physical network testing or monitoring resource may be received from ARNS 102. For example, ARNS 102 or NC 104 may send path information to client app 114. In this example, the path information may be for a partial path or route to a destination based on current location or may send a complete path or route and may include AR positional information usable by client app 114 to generate a visual AR overlay for navigating the user to the destination.

In step 906, the navigation information for navigating the user to the physical network testing or monitoring resource may be provided via a display. For example, client app 114 may utilize the screen of user device to display an AR overlay comprising visual indicators for indicating a path to a requested destination. In this example, the AR overlay may be shown over a live video of the user's real-world test environment (e.g., an corporation's campus or a related office building).

In some embodiments, ARNS 102 or NC 104 may be configured for identifying and providing navigation information usable for navigating a user or user device 112 to people associated with testing or monitoring (e.g., a tester or lab technician). For example, client app 114 may be configured for requesting, from the AR navigation system, active user information indicating active users of the physical network testing or monitoring resource; selecting an active user of the physical network testing or monitoring resource to request navigation information for navigating the user to the active user; receiving, from the AR navigation system, navigation information for navigating the user to the active user; and providing, via the display, the navigation information for navigating the user to the active user. In this example, navigation to the active user may be based on positional information received from the active user or a related device, other user devices, a processed visual layout (e.g., a "map" or "blueprint" of the office), and/or other sources.

In some embodiments, a physical network testing or monitoring resource may include a platform, a chassis, a device, a component, or hardware usable for testing or monitoring a network or one or more network devices. Example physical network testing or monitoring resources may include SUT components, port modules, routers, servers, switches, processors, memory, storage devices, and test platforms.

In some embodiments, navigation information for navigating a user to a physical network testing or monitoring resource may include or be displayed as an AR overlay comprising visual instructions or visual indicators.

In some embodiments, client app 114 may include an operational mode (e.g., an 'x-ray' mode) for displaying a visual indicator associated with the physical network testing or monitoring resource, wherein the visual indicator indicates the location of the physical network testing or monitoring resource relative to user device 112 regardless of whether the physical network testing or monitoring resource is currently visible to the user.

In some embodiments, client app 114 may include an operational mode for reducing data storage requirements by dynamically requesting a portion of the navigation information based on the current location of the user device. For example, client app 114 may utilize tiling or another technique such that only a relevant portion of a path or navigation information is downloaded. In this example, client app 114 may dynamically request additional path or navigation information as the user travels to their destination.

In some embodiments, client app 114 may display or provide adjusted navigation information based on temporary path change information, e.g., indicating traffic or temporary obstructions. For example, client app 114 may be configured to identify and provide adjusted navigation information locally based on self-identified traffic or temporary obstructions. In another example, client app 114 may be configured to send potentially path changing information to ARNS 102 or NC 104 while client app 114 is in use and, if a temporary path is determined based on this provided information, ARNS 102 or NC 104 may send adjusted navigation information to client app 114 for use.

In some embodiments, ARNS 102 or NC 104 may include or use a location data store for storing AR positional information indicating locations of multiple entities and a path data store for storing path information for navigating to the multiple entities.

In some embodiments, reachable entities may include a physical network testing or monitoring resource, or a person (e.g., a tester or lab technician) associated with testing or monitoring, or a physical location (e.g., a test lab or a tester's office or cubicle) associated with testing or monitoring.

In some embodiments, ARNS 102 or NC 104 receives a visual layout of the real-world test environment and uses image processing to process the visual layout to generate at least a portion of the path information and the locations. For example, a user may provide an image of an office layout containing rooms with employees' names. In this example, ARNS 102 or NC 104 may process the image to extract location and people information and may store the extracted information and/or derived information, e.g., locations and paths to employees' offices may be stored in data stores 106-108.

In some embodiments, ARNS 102 or NC 104 may receive path training information from client app 114 via one or more discrete training sessions or when client app 114 is running. In such embodiments, the path training information may include AR positional information for indicating one or more locations of one or more viewed entities and may be used by the AR navigation system for determining one or more viable paths to the one or more viewed entities. For example, as a user is walking with client app 114 active, a camera may view a person's face, an ID badge on a person, or a QR locator code on a sticker attached to a chassis. In this example, in response to identifying an reachable entity or related identifier, client app 114 may send AR positional information related to the identified entity such that ARNS 102 or NC 104 can store the information in location data store 106 and generate a path to reach the identified entity and store related path information in path data store 108.

It will be appreciated that process 900 is for illustrative purposes and that different and/or additional actions may be used. It will also be appreciated that various actions described herein may occur in a different order or sequence.

It should be noted that ARNS 102, NC 104, client app 114, and/or functionality described herein may constitute a special purpose computing device. Further, ARNS 102, NC 104, client app 114, and/or functionality described herein can improve the technological field of AR navigation in an indoor test environment by providing various techniques to identify and navigate to physical network testing or monitoring resources, persons associated with testing or monitoring, and/or areas related to testing or monitoring. For example, ARNS 102, NC 104, client app 114, and/or functionality described herein can be used to help a user navigate to various entities in a real-world environment after being trained using various training modes and/or operations. In this example, the AR navigation may involve generating a camera overlay image that includes visual indicators for helping the user navigate through the environment toward the selected entity to a physical resource in a real-world environment.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for augmented reality navigation in network test environments, the method comprising:
   at a user device of a user, wherein the user device is executing an augmented reality (AR) navigation application:
      providing, via the AR navigation application and to an AR navigation system, an image of an office layout representing an office in a real-world test environment;
      receiving, via the AR navigation application and from the AR navigation system, a request for the user to visit, while carrying the user device, two or more points of the office layout in the real-world test environment;
      sending, via the AR navigation application and to the AR navigation system, distance information between the two or more points visited, wherein the AR navigation system uses the distance information in determining a scale of the office layout and generates a virtual representation of the office based on the determination;
      communicating, via the AR navigation application and to the AR navigation system, user location information and resource identification information obtained from a visual code or a user interface, wherein the resource identification information indicates a physical network testing or monitoring resource in the real-world test environment;
      receiving, via the AR navigation application and from the AR navigation system, navigation information for navigating the user to the physical network testing or monitoring resource;
      providing, via a display, the navigation information for navigating the user to the physical network testing or monitoring resource;
      requesting, via the AR navigation application and from the AR navigation system, active user information indicating active users of the physical network testing or monitoring resource;
      selecting, via the AR navigation application, an active user of the physical network testing or monitoring resource to request navigation information for navigating the user to the active user;
      receiving, via the AR navigation application and from the AR navigation system, navigation information for navigating the user to the active user; and
      providing, via the display, the navigation information for navigating the user to the active user, wherein providing the navigation information includes generating an augmented path overlay that includes visual indicators indicating a path for the user to follow and providing, via the display, the augmented path overlay over a live video of the real-world test environment.

2. The method of claim 1 wherein the physical network testing or monitoring resource includes a platform, a chassis, a device, a component, or hardware usable for testing or monitoring a network.

3. The method of claim 1 wherein the AR navigation application includes an operational mode for displaying a visual indicator associated with the physical network testing or monitoring resource, wherein the visual indicator indicates the location of the physical network testing or monitoring resource relative to the user device regardless of whether the physical network testing or monitoring resource is currently visible to the user.

4. The method of claim 1 wherein the AR navigation application includes an operational mode for reducing data storage requirements by dynamically requesting a portion of the navigation information based on a current location of the user device.

5. The method of claim 1 wherein the AR navigation application provides adjusted navigation information based on temporary path change information indicating traffic or temporary obstructions.

6. The method of claim 1 wherein the AR navigation system includes a location data store for storing AR positional information indicating locations of multiple entities and a path data store for storing path information for navigating to the multiple entities.

7. The method of claim 6 wherein the multiple entities includes the physical network testing or monitoring resource, or a person associated with testing or monitoring, or a physical location associated with testing or monitoring.

8. The method of claim 6 wherein the AR navigation system uses image processing to process the office layout to generate at least a portion of the path information and the locations of the multiple entities.

9. The method of claim 6 wherein the AR navigation system receives path training information from the AR navigation application via a discrete training session or when the AR navigation application is running, wherein the path training information includes AR positional information for indicating one or more locations of one or more viewed entities and is used by the AR navigation system for determining one or more viable paths to the one or more viewed entities.

10. A system for augmented reality navigation in network test environments, the system comprising:
    a user device; and
    at least one processor, wherein the user device is configured to execute an augmented reality (AR) navigation application using the at least one processor, wherein the AR navigation application is configured for:
        providing, to an AR navigation system, an image of an office layout representing an office in a real-world test environment;
        receiving, from the AR navigation system, a request for a user to visit, while carrying the user device, two or more points of the office layout in the real-world test environment;
        sending, to the AR navigation system, distance information between the two or more points visited, wherein the AR navigation system uses the distance information in determining a scale of the office layout and generates a virtual representation of the office based on the determination;
        communicating, to the AR navigation system, user location information and resource identification information obtained from a visual code or a user interface, wherein the resource identification information indicates a physical network testing or monitoring resource in the real-world test environment;
        receiving, from the AR navigation system, navigation information for navigating the user to the physical network testing or monitoring resource;
        providing, via a display, the navigation information for navigating the user to the physical network testing or monitoring resource;
        requesting, from the AR navigation system, active user information indicating active users of the physical network testing or monitoring resource;
        selecting an active user of the physical network testing or monitoring resource to request navigation information for navigating the user to the active user;
        receiving, from the AR navigation system, navigation information for navigating the user to the active user; and
        providing, via the display, the navigation information for navigating the user to the active user, wherein providing the navigation information includes generating an augmented path overlay that includes visual indicators and providing, via the display, the augmented path overlay over a live video of the real-world test environment.

11. The system of claim 10 wherein the physical network testing or monitoring resource includes a platform, a chassis, a device, a component, or hardware usable for testing or monitoring a network.

12. The system of claim 10 wherein the AR navigation application includes an operational mode for displaying a visual indicator associated with the physical network testing or monitoring resource, wherein the visual indicator indicates the location of the physical network testing or monitoring resource relative to the user device regardless of whether the physical network testing or monitoring resource is currently visible to the user.

13. The system of claim 10 wherein the AR navigation application includes an operational mode for reducing data storage requirements by dynamically requesting a portion of the navigation information based on a current location of the user device.

14. The system of claim 10 wherein the AR navigation application provides adjusted navigation information based on temporary path change information indicating traffic or temporary obstructions.

15. The system of claim 10 wherein the AR navigation system includes a location data store for storing AR positional information indicating locations of multiple entities and a path data store for storing path information for navigating to the multiple entities.

16. The system of claim 15 wherein the multiple entities includes the physical network testing or monitoring resource, or a person associated with testing or monitoring, or a physical location associated with testing or monitoring.

17. The system of claim 15 wherein the AR navigation system uses image processing to process the office layout to generate at least a portion of the path information and the locations of the multiple entities.

18. The system of claim 15 wherein the AR navigation system is configured to receive path training information from the AR navigation application via a discrete training session or when the AR navigation application is running, wherein the path training information includes AR positional information for indicating one or more locations of one or more viewed entities and is used by the AR navigation system for determining one or more viable paths to the one or more viewed entities.

19. A non-transitory computer readable medium having stored thereon executable instructions that when executed by at least one processor of at least one computer cause the at least one computer to perform steps comprising:

at a user device of a user, wherein the user device is configured to execute an augmented reality (AR) navigation application:

provinding, via the AR navigation application and to an AR navigation system, an image of an office layout representing an office in a real-world test environment;

receiving, via the AR navigation application and from the AR navigation system, a request for the user to visit, while carrying the user device, two or more points of the office layout in the real-world test environment;

sending, via the AR navigation application and to the AR navigation system, distance information between the two or more points visited, wherein the AR navigation system uses the distance information in determining a scale of the office layout and generates a virtual representation of the office based on the determination;

communicating, via the AR navigation application and to the AR navigation system, user location information and resource identification information obtained from a visual code or a user interface, wherein the resource identification information indicates a physical network testing or monitoring resource in the real-world test environment;

receiving, via the AR navigation application and from the AR navigation system, navigation information for navigating the user to the physical network testing or monitoring resource;

providing, via a display, the navigation information for navigating the user to the physical network testing or monitoring resource;

requesting, via the AR navigation application and from the AR navigation system, active user information indicating active users of the physical network testing or monitoring resource;

selecting, via the AR navigation application, an active user of the physical network testing or monitoring resource to request navigation information for navigating the user to the active user;

receiving, via the AR navigation application and from the AR navigation system, navigation information for navigating the user to the active user; and providing, via the display, the navigation information for navigating the user to the active user, wherein providing the navigation information includes generating an augmented path overlay that includes visual indicators indicating a path for the user to follow and providing, via the display, the augmented path overlay over a live video of the real-world test environment.

20. The non-transitory computer readable medium of claim 19 wherein the physical network testing or monitoring resource includes a platform, a chassis, a device, a component, or hardware usable for testing or monitoring a network.

* * * * *